United States Patent [19]

Giltner et al.

[11] 4,386,416

[45] May 31, 1983

[54] DATA COMPRESSION, ENCRYPTION, AND IN-LINE TRANSMISSION SYSTEM

[75] Inventors: Michael E. Giltner, Plano; Jack C. Mueller; Robert R. Fiest, both of Carrollton, all of Tex.

[73] Assignee: Mostek Corporation, Carrollton, Tex.

[21] Appl. No.: 261,123

[22] PCT Filed: Jun. 2, 1980

[86] PCT No.: PCT/US80/00686
§ 371 Date: Jun. 2, 1980
§ 102(e) Date: Jun. 2, 1980

[87] PCT Pub. No.: WO81/03560
PCT Pub. Date: Dec. 10, 1981

[51] Int. Cl.³ .............................................. G06F 5/00
[52] U.S. Cl. .................................................... 364/900
[58] Field of Search ... 364/200 MS File, 900 MS File, 364/300

[56] References Cited

U.S. PATENT DOCUMENTS 3,535,696  10/1970  Webb ............................... 364/200
3,694,813   9/1972  Loh et al. ......................... 364/200
4,021,782   5/1977  Hoerning ....................... 340/347 X Primary Examiner—Raulfe B. Zache

[57] ABSTRACT

An in-line data compression system which reduces the number of binary bits required to transmit a given text or similar message over a data network such as Telex or TWX. The compression unit can transmit or receive standard messages or can transmit compressed and encrypted messages to remote stations decrypt, and decompress messages from remote stations. The text data is compressed by identifying each word, searching for the word in a fixed library of words, and transmitting a first escape code plus the library address if the word is found. If the word is not found in the fixed library, a search is made for the word in a reconfiguration library and a second escape code plus the reconfiguration library address is transmitted if the word is found. If the word is not found in the reconfiguration library, the word is transmitted one character at a time using variable length character codes produced by a "Huffman" type code generator. The reconfiguration library is compiled by placing each word which is not in the library in the reconfiguration library before it is transmitted by variable length code. Then the second and each subsequent time that the same word is found in the message, the second escape code plus the address in the reconfiguration library will be transmitted in lieu of the Huffman coded characters of the word. The system is also applicable to compression of other types of data, serial or parallel, such as digital color television, for example.

42 Claims, 7 Drawing Figures

DATA COMPRESSION, ENCRYPTION, AND IN-LINE TRANSMISSION SYSTEM

FIELD OF THE INVENTION

This invention relates generally to data compression systems, and more specifically relates to a telecommunication system for compressing text or similar data, encrypting the compressed data, if desired, transmitting the compressed data to a remote station using a conventional telecommunications network, and for receiving, decrypting, and decompressing data transmitted from a remote station. The sytem may be used to compress data prior to storage and decompress the data after storage. This invention further relates to a unique data compression apparatus and method particularly suited for use in telecommunication systems.

DESCRIPTION OF THE PRIOR ART

Text data is normally transmitted using a fixed length binary code to represent each character. ASCII is a typical, standardized seven bit code for representing alphanumeric data of the type used to compile text messages. A typical English language word of five characters would thus require thirty-five bits. Common telecommunications systems such as "Telex" and "TWX" send the bits serially at a relatively slow rate by modern data processing standards. The cost of sending a message is directly related to the on-line time required for the message, so that a reduction in the length of a message results in a direct reduction in cost. Substantial efforts have been made to increase the speed of operation of data transmission systems to increase the number of bits of data transmitted in a given time interval. However, a vast amount of equipment having relatively low rates of data transmission is presently in place and cannot be easily ungraded. Color television can be digitally transmitted using a twentyfour bit code for each color pixel, but the bandwidth required to transmit this volume of information in real-time is very substantial. There are also many instances where large volumes of data are to be stored, and a reduction in the number of bits provides valuable data compression.

An alternative approach to increasing the rate at which data is transmitted over the network is to decrease the amount of data to be transmitted by more efficient coding techniques, thus effectively reducing the time of transmission or the bandwidth. It is generally recognized that data compression can be achieved by using variable length coding where the most commonly used characters are represented by a code having the mimimum bit length. This type of code is commonly referred to as a "Huffman" code, and several techniques of this type are disclosed in U.S. Pat. No. 3,694,813 entitled "Method of Achieving Data Compaction Utilizing Variable Length Dependent Coding Techniques", issued Sept. 26, 1972, to Lewis S. Loh, et al.

Message security is a recognized problem in the art and the United States National Bureau of Standards has developed a system for encrypting data to achieve such security. The encryption system has been implemented by a set of large scale integrated circuits which are presently commercially available.

SUMMARY AND OBJECTS OF THE INVENTION

The present invention is concerned with methods and apparatus which can be used in existing data handling systems to compress a data stream comprised of binary bits arranged into units of a set where the number of units in the set is very large. For example, if the words of the English language are the data units, there are approximately 65,000 words or units in common usage. Each word is comprised of one or more alphabetical characters, each of which is customarily represented by a binary code comprised of a predetermined number of binary bits, typically seven. The number of characters in each word-unit varies from one, or more by definition, to twenty or thirty. English language words can also be broken into common components referred to as prefixes, infixes, radixes, suffixes, etc., each of which can be defined as "word/units" to achieve very significant compression, in accordance with the present invention. A frequency of use analysis would reveal that a relatively small proportion of the words are used with much greater frequency than other words. The frequency of use is also dependent upon the particular users, and even upon particular messages. For example, certain words will be used with higher frequency in messages involving scientific subject matter than in those pertaining to merchandizing. If the average length of words used is only five characters, an average of thirty-five bits per word would be required to transmit the message.

Other types of data have similar characteristics. For example, each color pixel in digital video or similar facsimile systems can be produced by combinations of three basic colors, with eight binary bits used to represent two hundred fifty-six levels of intensity for each primary color. As a result, over sixteen million color shades and brightness combinations can be produced for each color pixel. However, most pictures are made up of a large number of color pixels of the same hue and intensity. Thus, the color television data may be considered as comprising a series of words/units, each three characters in length, where each character is represented by an eight bit code, or simply a fixed length unit of twenty-four bits, as contrasted with variable length units in the case of text words.

In accordance with the present invention, the most statistically recurrent portion of the total number of units are stored in a memory library. Then the memory library is searched for each word/unit and if the word/unit is found, the binary address of the word/unit in the library memory is substituted for the binary data representing the word/unit together with an appropriate code indicating that the substitution has been made. The binary data stream is thus compressed by compiling a data stream consisting alternatively of units in the original form, or the addresses of such units in a library memory, with an "escape code" designating which alternative is used. Decompression is then achieved by detecting the address data and fetching the unit from the same address of an identical library memory.

In accordance with a very important aspect of the invention, the library memory can be statistically compiled from any selected sample of data and stored permanently in a read-only memory, or can be sampled from the data actually being compressed and dynamically compiled in a "reconfiguration library".

In accordance with a specific embodiment of the invention, the compression method is used in a system for transmitting alphanumeric text or similar data comprised of "character" codes each having the same number of binary bits where the "characters" are arranged in a random manner to form "words" of variable character length in addition to individual characters, as for example, in the English language.

More specifically, the system sequentially sorts the data into either individual characters or valid words. When a word in the message is detected, a library is searched for the word, and if a word is found in the library, an escape code followed by the address of the word in the library is transmitted in lieu of the characters of the word. When the escape code is detected during decompression, the address is then used to fetch the word from an identical library for recompilation of the original message.

Depending upon the size of the library, the bits of address code can be significantly less than the total bits for all of the individual character codes for the word, resulting in significant shortening of the total bits in the message. Since the English language comprises approximately 65,000 words, the cost of a library containing all of the words would not be attractive for most applications. Furthermore, the greater the number of words in the library, the longer the address code required, so that the gain in data compression tends to decrease. Thus, the intermingling of addresses to a library of words with character codes for shorter and lesser used words in a data stream in accordance with this invention provides a very useful and practical approach to data compression. In a further important refinement of the invention, the character codes used in the data stream, either individually or those making up a word not found in the library, are transmitted using a variable length (Huffman) code to achieve even greater compression.

In accordance with another aspect of the invention, the library can be either a fixed library with selected, often used words stored in a read only memory (ROM), or a reconfiguration library with the words stored in read/write memory, commonly referred to as random access memory (RAM), or a combination of both by using two different escape codes.

The reconfiguration library is initially blank and is compiled incident to the handling of each message or data batch. After a word is detected for the first time, the reconfiguration library is searched for the word. Since the library is blank, the word is not found and is transmitted in character form. However, the word is written into the library at a selected address so that the next time it appears in the data batch, a search of the reconfiguration library will find the word and result in transmitting the address rather than the characters of the word. The receiving station builds an identical reconfiguration library by an identical system as the word is received the first time. As a result, when an address to the reconfiguration library is received, the second and subsequent times the word appears in the data batch, the word represented by the address will be fetched from the library and compiled in the message. Provision is made to accommodate new words after the reconfiguration library is full by replacing the word used the fewest number of times, and the entire library is erased at the start of each data batch. In this regard, a data batch can be defined as one or more sequential messages between the same reconfiguration library.

In a specific embodiment of the invention, a unit is provided which can be placed in the line between a keyboard/printer terminal and the network interface module of a telecommunication system, such as Telex or TWX. The unit has the capability to receive and store a message from the local terminal, includng the number of a remote terminal to be called. The unit then accesses the network, calls the remote terminal and ascertains if the remote terminal is capable of accepting a compressed message, and of decrypting a message, all without operator attention. The unit then transmits the message in standard form if the remote terminal is not compatable, or sends a compressed message, optionally encrypted, if the remote terminal is compatible. The unit is also capable of receiving and storing a standard or compressed and encrypted message from a remote terminal, while simultaneously accepting and storing a message from the local terminal if necessary, then decrypting and decompressing the received message before outputting it to the printer of the local terminal. Any simultaneously received message from the local terminal can then be transmitted to a remote terminal.

In accordance with other aspects of the invention, the unit may transmit to and receive from a data storage system, or may advantageously compress similar data other than the language text data.

DETAILED DESCRIPTION OF THE DRAWINGS

The novel features believed characteristic of this invention are set forth in the appended claims. The invention itself, however, as well as other objects and advantages thereof, may best be understood by reference to the following detailed description of an illustrative embodiment, when read in conjunction with the accompanying drawings, wherein:

Figure 1:
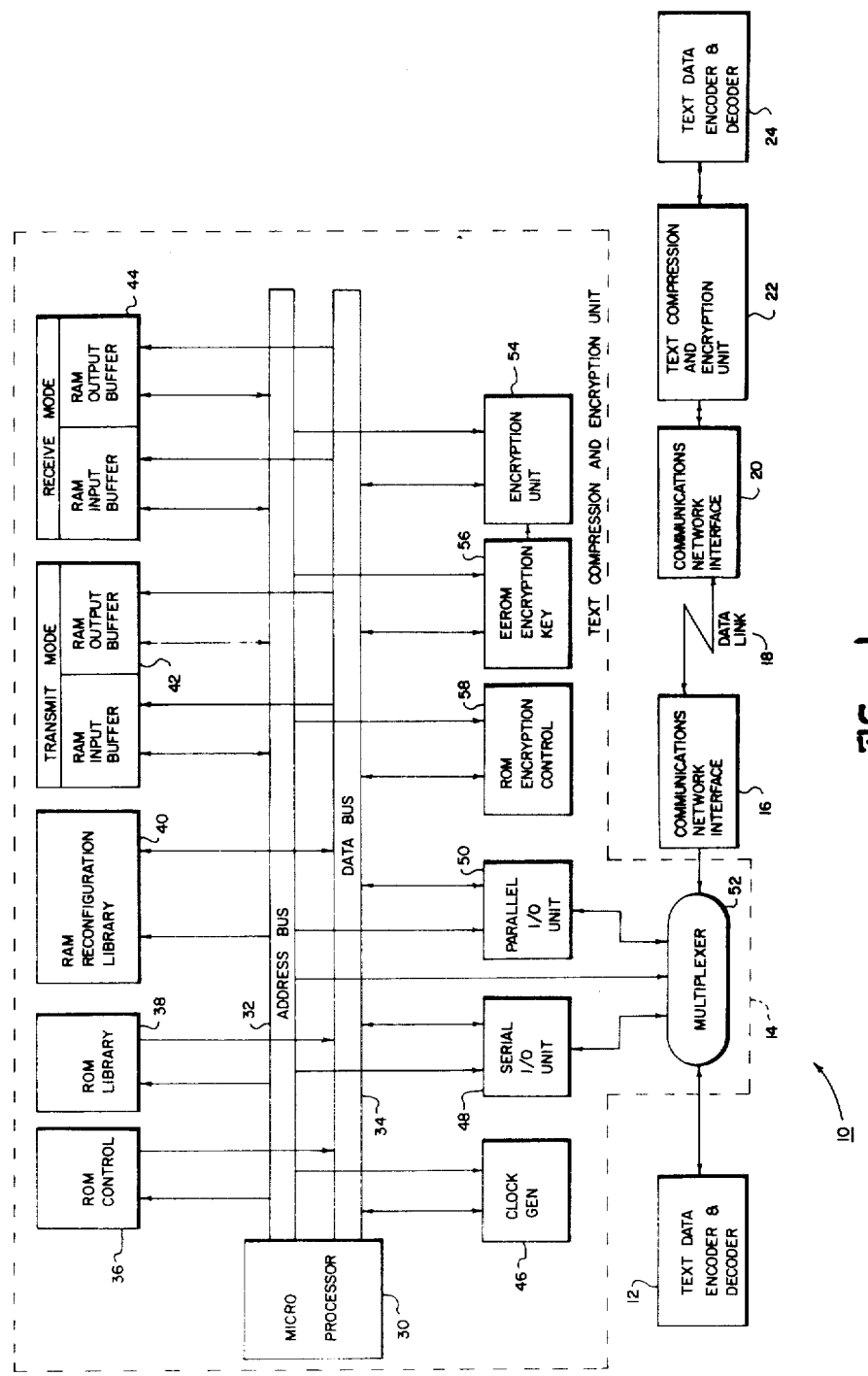
FIG. 1 is a schematic block diagram of a system in accordance with the present invention.

Referring now to the drawings, a system in accordance with the present invention is indicated generally by the reference numeral 10 in FIG. 1. The system 10 is comprised of a local text data encoder and decoder 12 which is coupled to a text compression and encryption unit 14 which in turn is coupled to a communications network by an interface unit 16. The communications network includes conventional data links to a large number of remote terminals, one of which is represented by the communications network interface unit 20, a text compression and encryption unit 22 identical to unit 14, and the text data encoder and decoder 24.

The text data encoder and decoders 12 and 24 may be any conventional unit for encoding a text data into binary data. For example, units 12 and 24 may be conventional Telex or TWX units having keyboards for encoding alphanumeric messages from keyboard entries and presenting these messages as binary data using a standard fixed-length code such as ASCII. The units 12 and 24 typically have some means for off-line message preparation, such as a punched tape unit for compiling messages to minimize on-line time during transmission, and a printer for displaying and recording the messages sent and received. The communications network interfaces 16 and 20 may be the standard units used to couple such devices to rented communication network lines. The text compression and encryption units 14 and 22 are coupled in-line between the respective text data encoder and decoders and the communications network interfaces and appear essentially transparent to an operator of the text data encoders and decoders 12 and 14 except for added features and advantages as hereafter described in greater detail.

The text compression and encryption unit 14, for example, may entirely consist of conventional semiconductor devices including a microprocessor 30 having an address bus 32 and a data bus 34, each with multiple lines for parallel flow of binary signals, in the conventional manner. The sequence of operation of the microprocessor 30 is controlled by a read only memory control 36. Control 36 contains all of the instructions necessary to carry out the operation of the microprocessor as described herein in connection with FIGS. 2-7. A read only memory library 38 is filled with a preselected number of the most commonly used English words. A random access (read/write) reconfiguraion library 40 is a conventional random access (read/write) memory and is also coupled to the buses 32 and 34. Additional random access memory capacity provides input and output buffers for the transmit mode and the receive mode as represented by blocks 42 and 44. The various random access memories (RAMs) can be one or more large scale integrated circuits of conventional design. A clock generator 46 is provided to control the operation of the unit 14 independently of the text data encoder and decoder 12, or the communications network interface 16. A serial input/output unit 48 and a parallel input/output unit 50 are coupled through a multiplexer switching circuit 52 to the text data encoder and decoder 12, and to the communications network interface 16. The components 48, 50 and 52 collectively provide the unit with the capability to operate on either serial or parallel bits of binary data, and to receive from both the load and remote terminals simultaneously or send to both the local and remote terminals simultaneously.

The unit 14 also includes a National Bureau of Standards encryption unit 54, an electrically programmable read only memory (EEROM) encryption key unit 56 and a read only memory (ROM) encryption control unit 58. The unit 14 includes a mechanical key operated switch which allows the respective operators to input the same encryption keys to to EEROM element 56 at the respective sending and receiving terminals. The ROM encryption control unit contains the control for operating the microprocessor 30 as it relates to the encryption. The units 54, 56 and 58 combine to provide a system for encrypting a message in accordance with the algorithm provided by the National Bureau of Standards and all units are presently commercially available.

Figure 2:
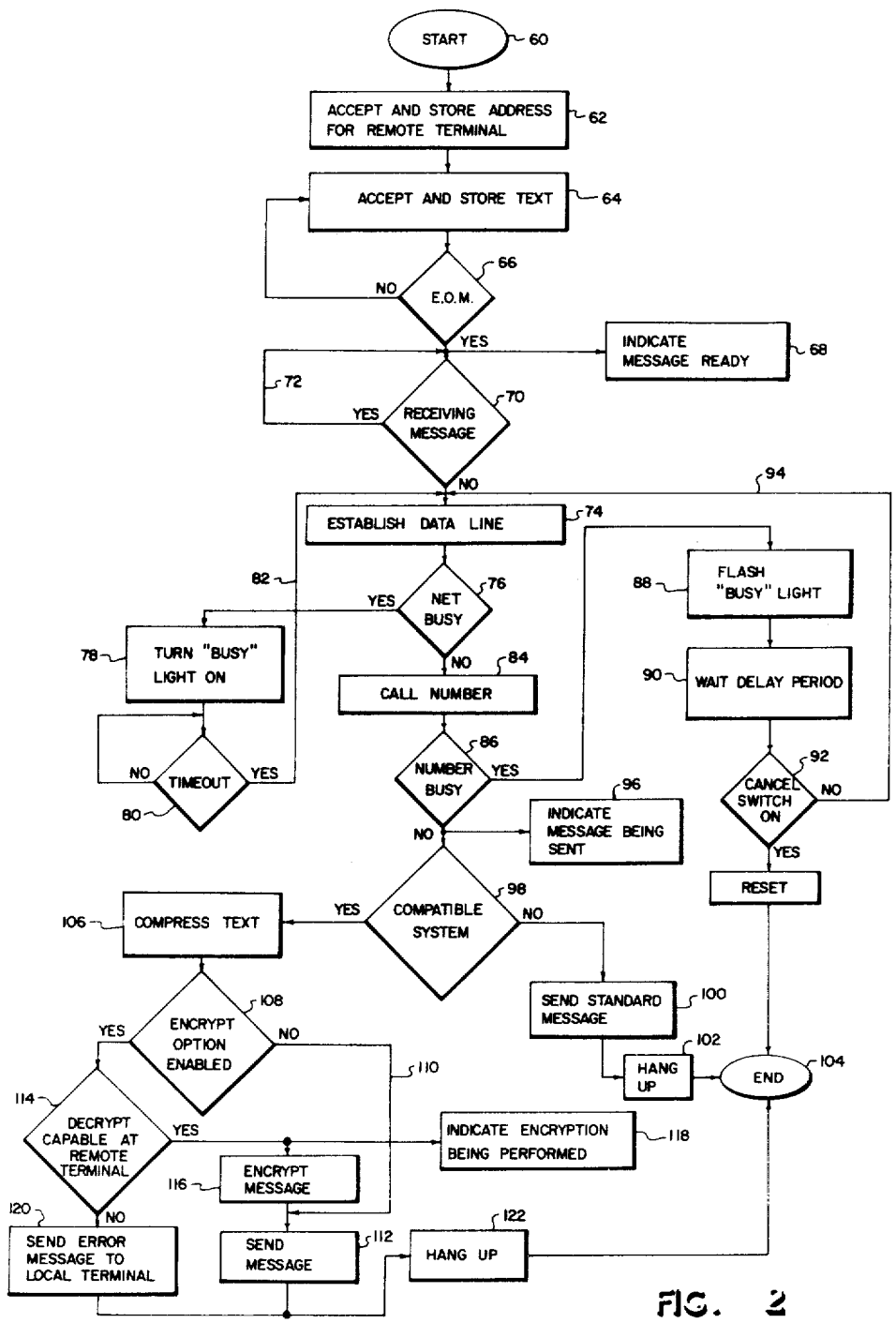
FIG. 2 is a schematic flow diagram which represents the operation of the system of FIG. 1 when receiving a message from a local terminal and transmitting the message to a remote terminal.

The read only memory control 36 is programmed to operate the unit 14 in the sequence represented by the flow diagram of FIG. 2. Starting at point 60, the unit 14 accepts and stores, from the local terminal 12, the address for the remote terminal 24, for example, as represented by block 62, followed by the text of the message which is stored in the transmit mode RAM input buffer as represented by block 64. The text being accepted is normally in the form of a sequence of fixed length codes each representing an alphanumeric character, punctuation, space code, etc., the most typical code being ASCII. The unit 14 continues to accept and store text until an end of message (E.O.M.) signal is detected as represented by decision block 66. When an end of message code is detected, the unit indicates to the local terminal operator that the message is ready to be sent, as represented by block 68, and also determines whether or not the local unit 14 is receiving a message from the network as represented by decision block 70. If a message is being received from the network, the program enters a loop 72 until the unit is no longer functioning in the receive mode.

If the unit is not receiving a message, the unit 14 establishes the line to the network in the same manner the local terminal 12 would have, as represented by block 74. This procedure would be determined by the type of local station 12 and network into which the unit 14 is placed. If it is determined that the network is busy, as represented by decision block 76, a busy light is turned "on" as represented by decision block 78, and the unit enters a time-out mode, as represented by decision block 80, until a predetermined period of time has lapsed before once again attempting to establish the line to the network, as represented by the closed loop 82. This procedure is repeated until the unit determines at decision block 76 that the network is available, at which time the unit calls the number for the remote terminal, as represented by block 84. If the called number is determined to be busy, as represented by decision block 86, the unit flashes the busy light as represented at 88, waits a predetermined delay period, as represented by block 90, then checks to see if the operator has in the meantime cancelled the message, as represented by decision block 92. If the operator has not cancelled the message, the unit returns to again establish the network line, as represented by return loop 94, and repeats the procedure again until the remote terminal answers. At this time, the unit indicates to the operator that the message is being sent as represented by block 96.

If a compatible text compresion and encryption unit (TCEU), such as unit 22, is at the remote terminal being called, the answer back from the remote unit will include a code indicating that it is a compatible TCEU. If the answer back indicates that the receiving terminal is not a compatible TCEU, the local unit detects this fact, as represented by decision block 98, and then proceeds to send a standard message, as represented by data block 100, directly from the transmit mode RAM input buffer 42. When transmission of the standard message has been completed, the unit hangs up, as represented by block 102, and the transmit procedure is completed, as represented by the end of program block 104.

However, if the remote station answers back that it includes a compatible TCEU, the local unit 14 then enters a compress text procedure, as represented by block 106, and performs text compression as will hereafter be described in greater detail in connection with FIGS. 4, 5 and 6. The unit then determines whether or not the operator has selected the encrypt option, as represented by the decision block 108. If the encrypt option is not enabled by the operator, the unit proceeds directly by way of line 110 to send the message as represented by block 112. If the encrypt option is enabled by the operator of the local terminal, and the remote terminal is compatible and has the capability to decrypt the message, as represented by decision block 114, the message is then encrypted, as indicated by block 116, and an indication is made to the operator that the message is being encrypted, as represented by block 118. If the remote station cannot decrypt the message, an error message is sent to the operator of the local terminal as represented by block 120. If the message is encrypted at block 116, the encrypted message is transmitted as represented by block 112. After the message is sent, the unit hangs ups, as represented by block 122, and the transmission of the message is ended as represented at 104.

Figure 3:
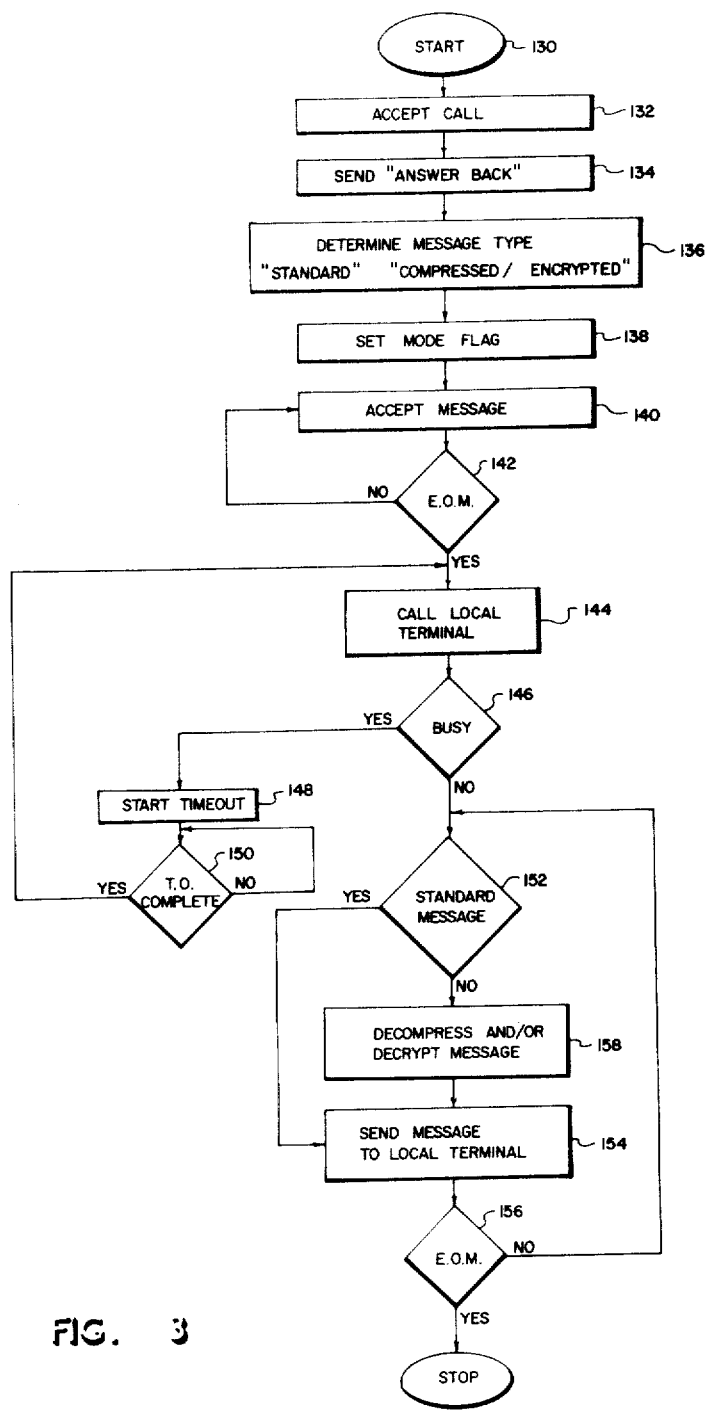
FIG. 3 is a schematic flow diagram illustrating the operation of the system of FIG. 1 when receiving a message from a remote terminal and forwarding the message to the local terminal.

An incoming call from a remote terminal is received by the unit 14 using the procedure represented by the diagram of FIG. 3. Starting at point 130, the unit accepts the incoming call using the same procedure as the local unit 12 would have if unit 14 were not in the line, as represented by the block 132, and sends an "answerback" as represented by block 134 which signals the decompression and decryption capability of the unit, and also provides a standard answerback in the event the calling station does not have a compatible text compression and encryption unit, such as unit 22. Next the type of incoming message is detected, as represented by block 136, to determine if the incoming message is to be standard or to be a compressed and/or an encrypted message. A mode flag is set, as represented by block 138, indicating the type of message to be received, and the message is then accepted, as represented by block 140, and placed in the receive mode random access memory input buffer 44. The message is accepted until an end of message (E.O.M.) code is detected, as represented by decision block 142, at which time the local terminal is called, as represented by block 144.

It will be recalled from a description of FIG. 2 that the unit 14 does not initiate a calling sequence while a message is being received, which is represented by the decision block 70 in FIG. 2. If the local terminal is busy, as represented by decision block 146, the unit proceeds to a time out procedure, as represented by block 148, and time out complete decision block 150 before returning to attempt the call to the local terminal, as represented by block 144. On the other hand, if the local terminal 12 is not busy, the unit proceeds to review the mode flag previously set, as represented by the decision block 152, to determine whether the message which has been accepted is a standard message or a compressed-/encrypted message. If the message is a standard message, the unit proceeds to send the message to the local terminal, as represented by block 154 until the end of message code is detected at the decision block 156. On the other hand, if decision block 152 indicates that the received message is either compressed and/or encrypted, the unit proceeds through the decompression and/or decrypted procedure as represented by the block 158, and as described in greater detail in connection with FIG. 7, which will presently be described in detail.

The typical text message handled by a TWX system, for example, is comprised of a series of words of a variable number of characters and punctuation and spaces. These characters, including numerals and letters, are typically represented by the conventional ASCII code which utilizes seven binary bits for each space and/or character. These characters are customarily transmitted by means of the seven bit code serially so that a typical six character word would require forty-two binary bits. In accordance with the present invention, the message is broken down into valid words, which are represented by library addresses, and characters, which are represented by character codes, preferably variable length Huffman type codes. The library addresses are preceded by unique escape codes which cause the receiving terminal to exit a standard character level decoding routine and fetch a word from the library address following the escape codes.

Thus the first order of compression is to detect whether a valid "word" exists or not. A valid word can be defined, for example, as a predetermined number of characters, typically two, interposed between two space codes, or between a space code and a punctuation code. If a valid word is not detected, that portion of the message is transmitted at the character level using a variable length code (Huffman). If a valid word is detected, the local library is searched for the word. If the word is found in the library, the space code leading the word is changed to an escape code, which indicates not only the beginning of a word, but that the word is represented by the address in an identical library at the receiving terminal. When the escape code is detected at the receiving terminal, the address following the escape code is used to fetch the word stored in the library and substitute the word for the address in the message being recompiled. In the absence of an escape code, the recompilation of the message reverts to the character level.

In accordance with an important aspect of the invention, the word library may be comprised of either a fixed library or a reconfiguration library, or preferably a combination of both. Although there are some 65,000 distinctive words in the English language, there are only a few hundred words which are repeatedly used in most communications. Communications in different industries tend to use certain words with greater frequency than others. Further, certain messages, including answering messages from remote stations, tend to repeat the same words with greater frequency. Accordingly, an important aspect of this invention is to provide a fixed library of limited capacity, for both initial cost considerations and also to keep the address codes short, for words which are commonly used for all messages, and to additionally provide a reconfiguration library for storing words used repeatedly in a given data batch. A data batch may be considered as one message, or a series of messages between the same two terminals.

Two or more types of libraries can be used in accordance with the broader concept of this invention by utilizing a corresponding number of different escape codes preceding the addresses for the respective libraries. Thus, in the embodiment of the invention herein described, escape code No. 1 is used to precede an address for the fixed library, and escape code No. 2 is used to precede an address for the reconfiguration library. Standard or variable length (Huffman) codes can then be used for any words not in any one of the libraries. As previously mentioned, the fixed library is contained in a read only memory (ROM) 38, while the reconfiguration library is contained in the random access memory 40. Thus, the words in the fixed library are selected using statistical analysis and are programmed at the time the ROM's are fabricated and cannot be changed. The reconfiguration library, on the other hand, is comprised of a fixed number of word positions in a read/write memory (RAM). In addition to an address, an access counter, which in the present embodiment counts from 0 through 7, is associated with each word position.

Thus, in the specific embodiment of the invention herein described, a search for each valid word detected is first made in the fixed library. If the word is found in the fixed library, escape code No. 1 followed by the address of the word in the fixed library is compiled for transmission. If the word is not found in the fixed library, a search for the word in the reconfiguration library is then made. If the word is found in the reconfiguration library, escape code No. 2 followed by the address in the reconfiguration library is compiled for transmission. If the word is not found in the reconfiguration library, the word is written into the reconfiguration library and then is compiled for transmission one character at a time using variable length Huffman codes.

When the compressed message is received, detection of either escape code No. 1 or escape code No. 2 results in the library word being fetched from the designated address of the respective library, which is identical to the respective library of the transmitting terminal. If no escape code is detected, however, the variable length codes representing the characters are decoded to standard character codes, and then any valid words detected. Any valid words detected by the receiving TCEU are then written into the receiving units reconfiguration library so that the receiving reconfiguration library will be identical to the transmitting TCEU's reconfiguration library. As a result, the second time that a word is encountered in a data batch, the transmitting unit will send the address of the word in the reconfiguration library, and the address will correspond to the address of the same word in the reconfiguration library of the receiving unit. Another important aspect of the present invention is the manner in which the reconfiguration library is compiled. This procedure will presently be described in detail in connection with FIGS. 5 and 6.

Figure 4:
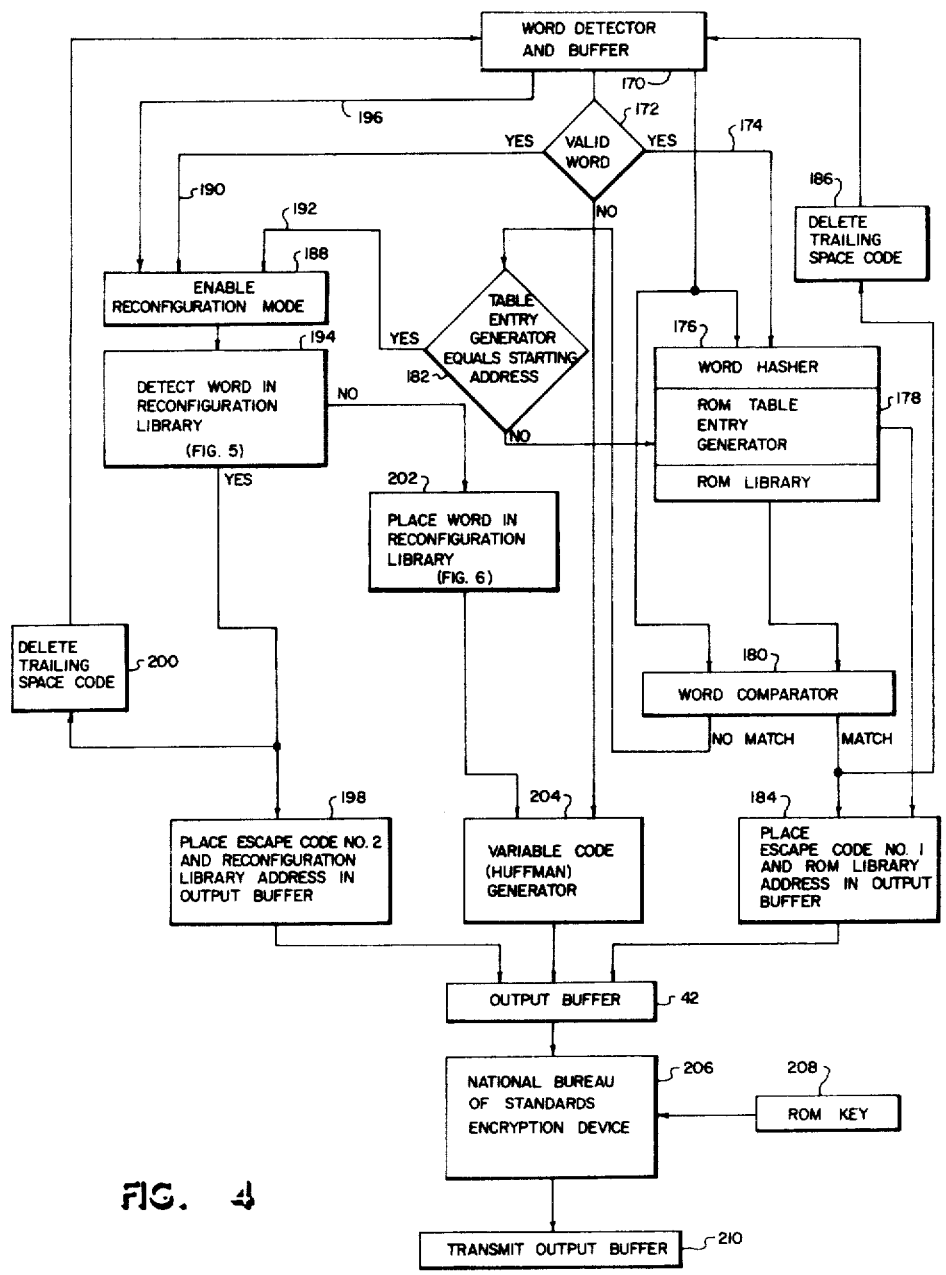
FIG. 4 is a schematic flow diagram illustrating the operation of the text compression and encryption unit when compressing and encrypting a message.
Figure 5:
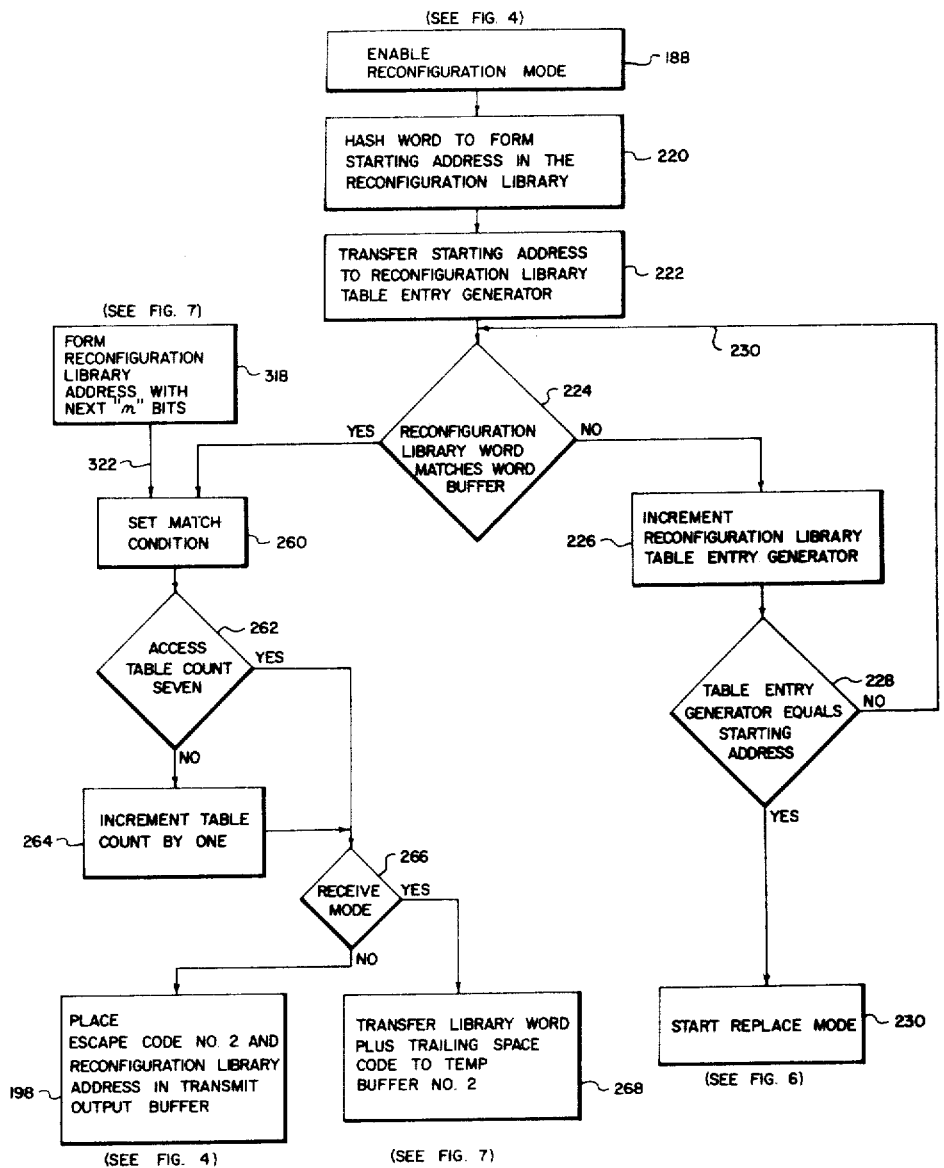
FIG. 5 is a schematic flow diagram which illustrates in greater detail a portion of the flow diagram illlustrated in FIG. 4.
Figure 6:
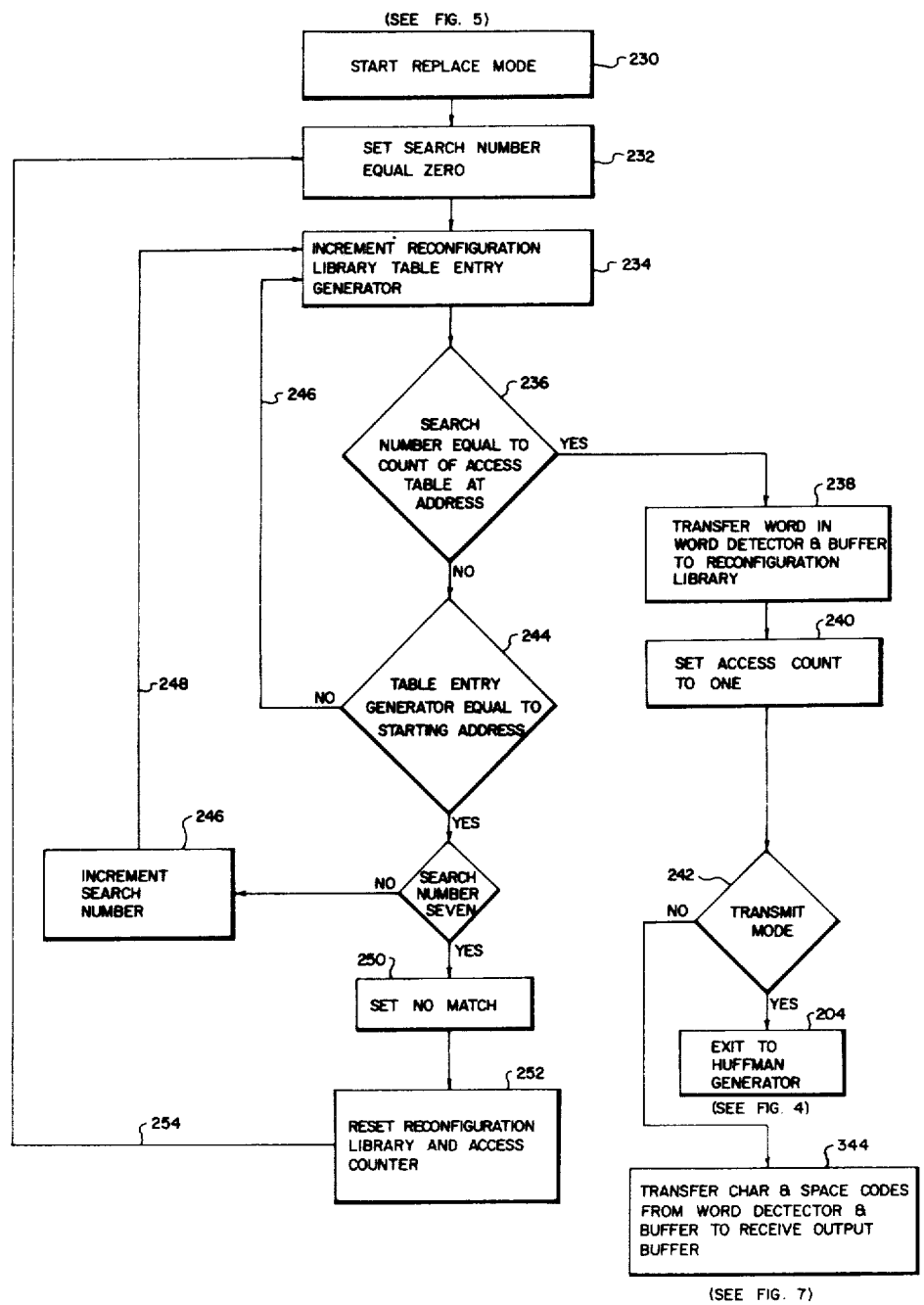
FIG. 6 is a schematic flow diagram similar to FIG. 5 which describes portions of the flow diagram of FIG. 4 in greater detail.

The unit 14 compresses text data in accordance with the method of the present invention as illustrated by the flow diagram of FIGS. 4, 5 and 6. The message data stored in the transmit mode RAM input buffer 42 is called up, one character at a time, to a word detector and buffer represented by the block 170. When a valid word is detected, as represented by the decision block 172, the ROM fixed library access is started, as represented by line 174, to determine whether or not the word is stored in the fixed library of the read only memory 38. The word is first put through a word hasher 176 where the word is hashed to an entry address of a ROM table entry generator represented by the block 178. This table entry generator defines the address of the word to be output from the ROM library to a word comparator 180. The word comparator 180 then compares the word from the ROM library with the word stored in the word detector and buffer 170. If the words do not match, a check is made to determine if the table entry generator equals the starting address, as represented by decision block 182. If not, the system returns to increment the ROM table entry generator to the next address to fetch the next word for comparison with the word in the word detector and buffer 170. If a word match is found in the ROM library, an escape code #1 together with the address from the ROM table entry generator are placed in the RAM output buffer 42 as represented by the block 184. Since a fixed length address code preceded by an escape code #1 is to be transmitted in lieu of the word, the trailing space code for the word need not be sent and is deleted as represented by block 186.

After all words in the ROM library have been compared with the word in the word detector and buffer 170 so that the table entry generator equals the starting address, the decision block 182 enables the reconfiguration mode, as represented at block 188. Thus when a valid word has been detected by decision block 172, as represented by line 190, and when the word does not have a match in the ROM library, as represented by line 192, the reconfiguration mode is enabled and the word stored in the word detector and buffer is made available for comparison to words stored in the configuration library, as represented generally by the block 194 by way of line 196. The procedure for detecting a word in the reconfiguration library will hereafter be described in detail in connection with FIG. 5. Assume for the moment that the word in the buffer 170 is contained in the reconfiguration library 194. In that case, the unit proceeds to place an escape code No. 2 and the reconfiguration library address in the output buffer 42, as represented by block 198. Since the reconfiguration library address is a fixed length, the trailing space code for the word is not needed and is deleted from the word as represented by block 200. On the other hand, if the word in the word detector and buffer 170 is not found in the reconfiguration library, the word is placed in the reconfiguration library using the procedure represented by block 202 which will hereafter be described in detail in connection with FIG. 6. After the word is placed in the reconfiguration library, the variable code (Huffman) generator is then activated, as represented by block 204, so that each character of the word in the word detector and buffer 170, including the necessary space codes and punctuation, are encoded with the desired variable length code. The variable length coded word is then transferred to the output buffer 42.

Assuming that the operator has elected to encrypt the message, the compressed message is then encrypted in the conventional manner, consisting of a series of variable length characters, space and punctuation codes, and escape codes and addresses, as represented by block 206, in accordance with the read only memory key then in effect, as represented by block 208, and the encrypted message returned to the transmit output buffer as represented by block 210.

Figure 7:
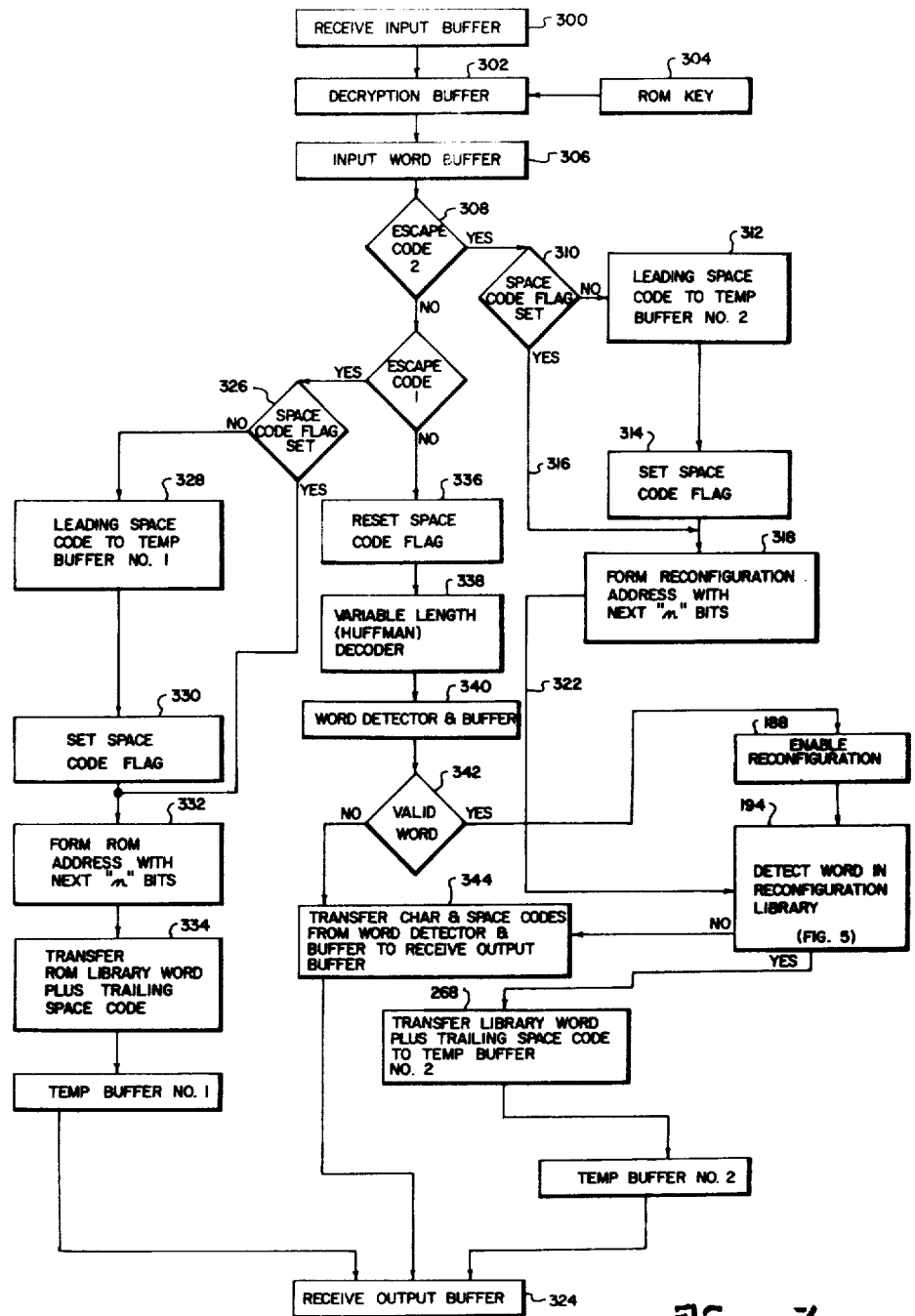
FIG. 7 is a schematic flow diagram illustrating the operation of the text compression and encryption unit of FIG. 1 when receiving a message from a remote terminal.

The reconfiguration mode illustrated in FIGS. 5 and 6 is used during both the transmit mode illustrated generally in FIG. 4 heretofore described in detail, and the receive mode illustrated generally in FIG. 7, which will hereafter be described in detail. The reconfiguration library 40 is comprised of read/write random access memory storage arranged to provide storage sites for a predetermined number of words. Associated with each site is an access address having a predetermined code length, and an access counter to indicate the number of times that the word at that address has been accessed since the last time the library was reset or erased. The access counter counts from zero through seven.

After the reconfiguration mode is enabled, as represented by block 188 in FIG. 5, the valid word is hashed to a starting address in the reconfiguration library, as represented by block 220. The starting address is transferred to the reconfiguration library table entry generator, as represented by block 222, and the word in the reconfiguration library at that address compared with the word in the word detector, as represented by the decision block 224. At the beginning of a message, all word positions in the reconfiguration library are reset and are empty, and the access counter for each word position is reset to zero. As a result, a no match condition occurs at the decision block 224 and the reconfiguration library table entry generator is incremented as represented by block 226. The new table entry generator address is then compared to the starting address as represented by block 228 to determine if the search of all word positions in the library has been completed. As a result, the search cycle will be repeated as represented by the feed-back line 230, the word is found or all words in the library have been compared to the word. Since the entire reconfiguration library is initially empty, the entire library will be cycled through until finally the address produced by the table entry generator will equal the starting address at which time the unit will transition to start the replace mode, as represented by block 230. The replace mode is described in detail in FIG. 6.

Referring now to FIG. 6, the unit proceeds from the start replace mode as represented by block 230 to set the search number equal zero, as represented by block 232. Next the reconfiguration library table entry generator is incremented by one count to address the first position after the starting address, as represented by block 234. Then the search number, which was set to zero, is compared to the count of the access table at the address defined by the table entry generator, as represented by decision block 236. On the first pass through, the first word position will be blank and the access table counter will accordingly be zero so that a match condition will occur. This results in proceeding to block 238, which represents the transfer of the word in the input buffer to the reconfiguration library at the position addressed by the table entry generator. Next the access counter for the word position is incremented to a count of one. Then if the system is operating in the transmit mode, as represented by the decision block 242, the unit proceeds to the Huffman generator procedure as represented by the block 204 in FIGS. 4 and 6, which has previously been described. The word is then ultimately transmitted one character at a time using the variable length Huffman codes. The word so transmitted will then be written into the receiving reconfiguration library at the same address for subsequent use, as will presently be described in connection with FIG. 7.

If the search number is not equal to the count of the access table at the address in decision block 236, the address produced by the table entry generator is compared to the starting address, as represented by decision block 244, and if they are not equal, the library table entry generator is again incremented, as represented by the return line 246. Thus as long as the result of both decision blocks 236 and 244 are no, the search will continue until the access count for all word positions in the reconfiguration library have been compared. When the table entry generator has returned to the starting address, the search number is compared to the number seven and if it is not seven, the search number is incremented, as represented by block 246, and the procedure repeated as represented by return line 248. In this manner, the position in which the word is to be written into the reconfiguration library is selected by determining the first word position having the lowest access count after the hashed address. The access counters provide a measure of which words in the reconfiguration library had been utilized the most number of times, and thus which are assumed to be most likely utilized in the future. When the search number finally reaches seven and the table entry generator has been cycled back to its starting address, a no match will be set as represented by block 250, and all words in the reconfiguration library will be erased and the access counters will all be reset to zero, as represented by block 252. The unit will then proceed back to block 232, as represented by return line 254. This will result in the word being written into the first word position after the starting address of the reconfiguration library since all word positions will then be blank. The reconfiguration library is also reset in the same manner at the end of each data batch, which will usually be a series of communications between the same terminals.

Referring once again to FIG. 5, if the word in the word buffer matches a word stored in the reconfiguration library, as represented by the yes output from decision block 224, a match condition is set as represented by block 260. The access table count for the word position from which the library word is matched is then checked to see if it is seven, as represented by decision block 262. If the access table count is not seven, the table count is incremented by one as represented by block 264. If the access table count has already reached seven, the unit proceeds directly to determine whether or not it is operating in the transmit mode, and if so an escape code No. 2 is placed in the transmit output buffer in advance of the reconfiguration library address, as represented by block 198 which is also common to FIG. 4. If the unit is operating in the receive mode, as will hereafter be described, the reconfiguration library word at the address in the reconfiguration library is transferred to the receive output buffer, as represented by block 268, so that the compiled messages may be subsequently output to the terminal which is local to the particular TCEU.

The receive mode for the TCEU units 14 and 22 is illustrated in FIG. 7. The incoming message is stored in the receive input buffer, as represented by block 300. If the message has been encrypted, it is transferred to the decryption buffer and decrypted in accordance with the current ROM key, as represented by blocks 302, 304, respectively, and ultimately sequenced into another input word detector and buffer 306 similar to the buffer 170 in FIG. 4. At this point, the incoming message is comprised of characters, space codes, punctuation codes, escape codes and library addresses. Since escape codes were placed in advance of each address in place of any leading space codes, the space codes must be reinserted in the message as the words are fetched from the libraries. If an escape code No. 2 is detected by decision block 308, indicating that the word is an address for the reconfiguration library, the status of a space code flag is checked by decision block 310. If the space code flag is not set, a leading space code is transferred to Temp Buffer No. 2, as represented by block 312. Then the space code flag is set as represented by block 314. As a result, the next time an escape code No. 2 is detected, the space code flag will be set, indicating that a trailing space code has already been put in Temp Buffer No. 2 as the last word was read from the reconfiguration library as will be described in connection with block 268 in FIG. 5.

The reconfiguration address is then formed with the next predetermined number of bits, as represented by block 318, and the address made available to the detect word in reconfiguration library procedure, represented by block 194, by way of line 322, which is also shown in the more detailed diagram of FIG. 5. The block 194 is the same as the block 194 illustrated in FIG. 4 and heretofore described in detail in connection with FIG. 5. As a result, the unit proceeds to set a match condition as represented by block 260 in FIG. 5, and increment the access table count if the count is not already seven, as represented by decision block 262 and block 264. Then, since the unit is in the receive mode, the unit proceeds through decision block 266 to block 268 which is also common to both FIGS. 5 and 7, to transfer the library word and a trailing space code to Temp Buffer No. 2. The space code previously input to the temporary buffer together with the library word are then transferred to the receive output buffer 324, and the trailing space code is available as a leading space code after the next word is fetched from either library.

On the other hand, if an escape code No. 2 is not detected, but an escape code No. 1 is detected, No. 1 indicating that the address is for the fixed library, the status of the space code flag is checked at decision block 326 so that if the space code flag is not set, a leading space code is set in temporary buffer No. 1, as represented by block 328 and then the space code flag is set as represented by block 330. If the space code flag is already set, the unit proceeds directly to form the fixed library address with the next n bits as represented by block 332. The library address then results in the library word being taken from the read only memory 38 and, together with a trailing space code, transferred to temporary buffer No. 1, as represented by block 334. As a result, the word together with the leading space code is transferred to the receive output buffer 324.

If neither an escape code No. 2 or an escape code No. 1 is detected, the space code flag is reset as represented by block 336. The variable length Huffman code representing the individual characters are then decoded by the variable length (Huffman) decoder represented by block 338, and stored in a word detector and buffer 340. Since a valid word is defined as two or more characters between space codes, or between a space code and a punctuation mark, once a word is stored in the word detector and buffer 340, it is then checked to see if the word is a valid word as represented by decision block 342. If a valid word is not detected, the character space codes and/or punctuation codes are transferred from the word detector and buffer to the Receive Output Buffer 324, as represented by block 344.

If a valid word is detected, the update reconfiguration mode is enabled as represented by block 188. Since the valid word transmitted by Huffman codes was, by definition, not in either library, the unit will enter the reconfiguration mode at the top of FIG. 5 and proceed through the replace mode of FIG. 6, all as previously described in detail, and will finally exit from decision block 242 to block 344, which indicates that the word plus space code is transferred from the word detector and buffer 340 to the receive output buffer 324. This results in the same words being stored in the same word positions of the reconfiguration library of the receiving TCEU as that of the transmitting TCEU having with the same access counts in both units. As a result, subsequent transmissions of addresses from the reconfiguration library of the transmitting TCEU will fetch the same word from the reconfiguration library of the receiving TCEU.

Since the unit 14 can operate at a substantially greater speed than data can be transmitted over most communications networks, a number of options are available in the sequence of operation. For example, as soon as a portion of a message is received from the local station and stored in memory, the unit will attempt to establish contact with the designated remote terminal. Compression of the message can then begin as soon as a suitable answerback is received. The message can then be simultaneously received from a local terminal, compressed, and transmitted to the remote terminal. This permits the use of smaller buffers 42 and 44 to handle messages of indefinite length. A similar approach can be used for receiving messages from remote terminals, decompressing the messages, and forwarding them to the local terminal.

From the above detailed description of a preferred embodiment of the invention, it will be appreciated by those skilled in the art that a unique and novel text compression system has been described. The text compression system may be advantageously used as an in-line addition for existing relatively slow speed data handling systems, particularly telecommunications systems. While the text compression system is particularly useful for English and other language text, it also has application in its broader aspects of compression to other data compiled in a similar format.

The system is described as part of a telecommunications system in which one text compression and encryption unit is used to communicate with other text compression and encryption units. However, since each unit is capable of both compressing and transmitting and receiving and decompressing, a single unit can be used to compress data for storage on a suitable off-line storage means in order to conserve storage space, and then decompress the data as it is read from the off-line storage. Such a system can also advantageously use either the fixed library, the reconfiguration library or both. When the reconfiguration library is utilized, the contents of the reconfiguration library can also be stored after a data batch is placed in storage, and then reestablished in the reconfiguration library prior to decompression of the stored data. The particular unit described herein provides a number of additional features when used in a telecommunication system, such as automatic call-up of the remote terminal, simultaneous receipt and storage of messages from a remote terminal and the local terminal, and the ability to encrypt compressed data for message security, thereby significantly reducing encryption time.

It will also be appreciated that the reconfiguration or "dynamically compiled" library is particularly useful in compressing color video data, or any similar data, since many successive frames in most presentations are substantially identical in color content, and change only at a slow rate. Further within each frame, the colors are often highly repetitious from color pixel to color pixel. Thus by selecting a reconfiguration library having $(2)^8$ positions, the data could be compressed to a minimum of one-third its original length. This is advantageous in reducing the bandwidth required to transmit the video signal in real time, or to reduce the volume of storage as well as the time required to transmit stored video data.

Although preferred embodiments of the invention have been described in detail, it is to be understood that various changes, substitutions and alterations can be made in the method and apparatus of the invention without departing from the spirit and scope of the invention as defined by the appended claims.

What is claimed is:

1. A system for compressing data by reducing the number of binary bits required to represent the data comprising:
   memory means for storing each of a plurality of selected units of a set of units in unit positions to form a library, each unit position having a memory address expressed in bits,
   processing means for detecting each unit in the data and searching the memory to determine if the respective unit in the data is in the library, and alternatively compiling data representative of the units which are not stored in the memory library or the addresses of the units which are stored in the memory library together with a code indicating which alternative is compiled in each instance.

2. The system of claim 1 wherein:
   each unit of data is representative of a word in a textual message,
   each word is comprised of two or more characters, and
   each character is represented by a predetermined number of binary bits.

3. The system of claim 2 wherein the processing means further comprises means for compiling the characters not included as a word unit stored in the library as a variable length code.

4. The system of claim 1 wherein:
   each unit of data is represented by the same number of binary bits, which number is greater than the number of binary bits required to represent the addresses of the unit positions in memory.

5. The system of claim 1 wherein
   the memory means for storing the selected unit comprises memory from which data can only be read.

6. The system of claim 1 wherein the memory means for storing the selected units is a memory into which data representative of the units can be written and from which the data representative of the units can be read.

7. The system of claim 6 wherein the memory means also includes means for storing selected units from which data can only be read, and wherein
   the processing means sequentially searches the portion of the memory means from which data can only be read and the portion of the memory means into which the data can be written and from which the data can be read.

8. The system of claim 6 wherein the processing means further comprises means for compiling the units which are not found in the library by a variable length code representing sub parts of the unit.

9. The system of claim 1 further comprising means coupled to the processing means for encrypting the compressed data stream.

10. The system of claim 1 wherein the units of data are each comprised of sub units of fixed binary length and the processing means compiles the units not stored in the memory means as a variable length code representing the fixed length sub units.

11. The system of claim 1 wherein the processing means further comprises:
    storage means for receiving and storing a non-compressed data stream received from an outside source, and
    the processing means includes
    means for transmitting a compressed data stream.

12. The system of claim 7 further comprising
    storage means coupled to the processing means for storing compressed data and wherein
    the processing means further comprises means for storing at least a portion of the compressed data stream before the compressed data stream is transmitted.

13. The system of claim 1 wherein the processing means further comprises:
    means for automatically receiving a standard data stream from a first station, compressing the data stream and sending the compressed data stream to a second station, or automatically receiving a compressed data stream from a second station, decompressing the received compressed data stream, and sending the decompressed data stream to the first station.

14. The system of claim 13 further comprising
    buffer means coupled to the processing means for storing call-up instructions for establishing communication with the second station and at least a portion of a standard message received from the first station, and wherein
    the processing means includes means for automatically executing the call up of the second station and compressing and sending the standard message so stored.

15. The system of claim 14 wherein the processor means includes
    means for detecting an answer back from the second station indicating whether the second station is equipped with decompression capability and for sending the data stream in standard form if the second station does not have decompression capability.

16. The system of claim 15 wherein the processor means includes:
    means for detecting whether a received data stream is in standard form or compressed form, and for sending a standard data stream received from the second station to the first station in standard form.

17. The system of claim 16 further comprising a second system for compressing data having the same capabilities as the system of claim 15, each of the systems being coupled to a local text encoding and decoding unit, and, the systems for compressing data being coupled by a data transmission link.

18. A text compression unit for disposition between a local text encoding and decoding station of a telecommunication network and the communications network interface for communication with remote stations which may or may not be equipped with a similar text compression unit comprising:
    multiplex means for coupling the unit between the local text encoding and decoding station and the network interface unit, and
    data processing and storage means coupled to the multiplex means for automatically receiving a standard data stream from the local station, compressing the standard data stream to produce a compressed data stream, and sending the compressed data stream to a remote station, and for receiving a compressed data stream from a remote station, decompressing the compressed data stream received from the remote station, and sending the decompressed data stream to the local station and for compiling a library of data units in a memory during compression of the data by writing each data unit into the memory upon the first occurrence of each data unit and for each occurrence thereafter compiling the address of the data 1 unit in the library instead of an original representation of the data unit.

19. The text compression unit of claim 18 wherein the data processing and storage means further includes means for:
   storing call-up instructions for establishing communications with the remote station and at least a portion of a standard message received from the local station,
   automatically and repeatedly executing the call-up of the remote station until the remote station answers-back,
   determining from the answer-back whether the remote station is equipped to decompress a compressed message, and either
   sending a compressed or standard message to the remote station in accordance with the capability of the remote station as signalled by the answer-back.

20. The text compression unit of claim 18 wherein the data processing and storage means further includes means for simultaneously receiving and storing a message from both the local station and from the remote station, then forwarding the respective messages to the other terminals.

21. The text compression unit of claim 18 wherein the data processing and storage means further includes means for:
   answering a call-up from a remote station with an indication of being equipped with compatible decompression means,
   receiving and storing a message from the remote station,
   determining whether the received message is a standard or compressed message,
   decompressing the message if compressed, and
   sending the standard message, either as received or as decompressed, to the local station.

22. The text compression unit of claim 18 wherein the data processing and storage means further includes a fixed library of words each stored at predetermined addresses from which the words can be read,
   a variable length encoder for encoding individual text characters as a variable number of binary bits with the least number of binary bits used to represent the most frequently occurring characters, and wherein
   the data processing and storage means compiles a compressed message by, with respect to each successive word of the standard message,
   (a) searching a fixed library for the word and compiling a first escape code plus the address of the word in the fixed library if the word is found, and if the word is not found
   (b) searching the reconfiguration library for the word and compiling a second escape code plus the address of the word in the fixed library is the word is found, and if the word is not found, then
   (c) writing the word into a word position of the reconfiguration library selected in a predetermined manner and
   (d) encoding each character of the word in a variable length code, and wherein
   the data processing and storage means compiles a decompressed message from a received compressed message by
   (a) unless a second or first escape code is detected, decoding the variable length code to compile the words in standard form in a standard message and writing the decoded characters of the words into a word position of the reconfiguration library selected in a predetermined manner, and
   (b) if a second escape code is detected, compiling the word from the address of the reconfiguration library received with the second escape code, and
   (c) if a first escape code is detected, compiling the word from the address of the fixed library received with the first escape code.

23. The text compression unit of claim 22 wherein the predetermined manner in which the word position in the reconfiguration library is selected by the data processing and storage means comprises:
   maintaining a resettable access counter for each word position to determine the number of times the word position designated by the address has been written into or read from, and establishing a sequential order in which the count of the access counters is determined,
   resetting all access counters at the beginning of a data batch to an initial lowest reference count,
   selecting the first word position in the sequential order of those word positions having the lowest count, and
   incrementing the count of the access counter for the word position each time the word position is accessed for writing or reading.

24. The text compression unit of claim 22 further comprising
   encryption and decryption means coupled to the data processing and storage means for encrypting a data stream for security in accordance with an ecryption key and for decrypting a data stream in accordance with said encryption key, and wherein
   the data processing and storage means further includes means for selectively operating the encryption and decryption means to encrypt the compressed data stream before the data stream is sent to a remote station, and
   detecting an encrypted data stream from a remote station and operating the encryption and decryption means to decrypt the incoming data stream to produce a compressed data stream for compression.

25. A method for compressing data by reducing the number of binary bits required to represent the data comprising:
   storing each of a plurality of selected units of a set of units in unit positions to form a library, each unit position having a memory address expressed in bits,
   detecting each unit in the data and searching the memory to determine if the respective unit is in the library, and alternatively compiling data representative of the units which are not stored in the memory library or the addresses of the units which are stored in the memory library together with a code indicating which alternative is compiled in each instance.

26. The method of claim 25 wherein:
   each unit of data is representative of a word in a textual message,
   each word is comprised of two or more characters, and
   each character is represented by a predetermined number of binary bits.

27. The method of claim 26 further comprising compiling the characters not included as a word unit stored in the library as a variable length code.

28. The method of claim 25 wherein:
each unit of data is represented by the same number of binary bits, which number is greater than the number of binary bits required to represent the addresses of the unit positions in memory.

29. The method of claim 25 wherein
the selected units stored in memory are selected statistically from data sample other than the specific data being compressed.

30. The method of claim 25 wherein the selected units stored in memory are selected statistically from the specific data batch being compressed.

31. The method of claim 30 further comprising
compiling the library of units in the memory during compression of the data by writing each unit into the memory upon the first occurrence of each unit to form a reconfiguration library and for each occurrence thereafter compiling the address of the unit in the library instead of the original representation of the unit.

32. The method of claim 31 wherein
the selected units stored in memory are selected statistically from a data sample over than the specific data being compressed and stored in a fixed library, and
sequentially searches the fixed library and the reconfiguration library and compiling the address of each unit found therein instead of the original data representative of the unit.

33. The method of claim 32 wherein the units are text words and further comprising compiling each character of the words which are not found in a library as a variable length code representing each character.

34. The method of claim 33 further comprising encrypting the compressed data stream.

35. The method of claim 25 further comprising encrypting the compressed data stream.

36. The system method of claim 25 wherein the units of data are each comprised of sub units of fixed binary length and the units not stored in the memory means are compiled as a variable length code representing the fixed length sub units.

37. The method of claim 25 further comprising:
receiving and storing at least a portion of a non-compressed data stream from a sending source, and
storing at least a portion of the compressed data stream and then sending the compressed data stream to a receiving station.

38. The method of claim 25 further comprising
decompressing the compressed data stream by detecting the library addresses and compiling the original data by fetching units from an identically compiled library as designated by the respective addresses.

39. The method for compressing and decompressing data by reducing the number of binary bits required to represent the data, comprising:
(1) during compression compiling a reconfiguration library of data units in which data units are stored in a limited number of data unit positions in a memory by
(a) searching the reconfiguration library for each data unit and if the data unit is not stored in the library, writing the data unit into a data unit position selected in a predetermined manner and then compiling the data unit in a compressed data stream in a form representative of the original data, or
(b) if the data unit is stored in the reconfiguration library, compiling a code so indicating together with the address of the data unit in the reconfiguration library in the compressed data stream, and
(2) during decompression compiling a reconfiguration library of data units in which data units are stored in a corresponding number of data unit positions in a memory by distinguishing between data units and addresses in the compressed data stream, and
(a) when a data unit is received, searching the reconfiguration library for the data unit and if the data unit is not stored in the library, writing the data unit into a data unit position selected in said predetermined manner and then compiling the data unit in a decompressed data stream in a form representative of the original data, and
(b) when an address is received, compiling the data unit stored in the data unit position designated by the address in the decompressed data stream in the form of the original data.

40. The method of claim 39 wherein said predetermined manner of selecting the data unit positions comprises
establishing a predetermined sequence of search for the data unit positions,
establishing an access counter for each data unit position,
resetting all data unit positions to indicate that the positions are empty before the beginning of a data batch, and
writing each successive data unit not found in the reconfiguration library into the next successive data unit position having the lowest access count, and
incrementing the access counter for each data unit position each time the data unit position is accessed for writing data into or reading data from the data unit position.

41. The method for compressing text data having binary coded characters formed into words comprising
compiling a fixed library of words each stored at predetermined addresses in a memory from which the words can be read,
establishing a reconfiguration library having a plurality of empty word positions into which words can be written and from which words can be read,
providing variable length encoding for individual text characters as a variable number of binary bits with the least number of binary bits used to represent the most frequently occurring characters, and
compiling a compressed message by, with respect to each successive word of the standard message,
(a) searching the fixed library for the word and compiling a first escape code plus the address of the word in the fixed library if the word is found, and if the word is not found
(b) searching the reconfiguration library for the word and compiling a second escape code plus the address of the word in the fixed library if the word is found, and if the word is not found, then
(c) writing the word into a word position of the reconfiguration library selected in a predetermined manner and
(d) encoding each character of the word in a variable length code, and compiling a decompressed message from a received compressed message by (a) unless a second or first escape code is detected, decoding the variable length code to compile the words in standard form in a standard message and writing the decoded characters of the words into a word position of the reconfiguration library selected in a predetermined manner, and (b) if a second escape code is detected, compiling the word from the address of the reconfiguration library received with the second escape code, and (c) if a first escape code is detected, compiling the word from the address of the fixed library received with the first escape code.

42. The method of claim 41 wherein the predetermined manner in which the word position in the reconfiguration library is selected comprises:

maintaining a resettable access counter for each word position to determine the number of times the word position designated by the address has been written into or read from, and establishing a sequential order in which the count of the access counters is determined, resetting all access counters at the beginning of a data batch to an initial lowest reference count, selecting the first word position in the sequential order of those word positions having the lowest count, and incrementing the count of the access counter for the word position each time the word position is accessed for writing or reading.

* * * * *